United States Patent
Markyvech et al.

(10) Patent No.: US 8,002,937 B2
(45) Date of Patent: Aug. 23, 2011

(54) ALIGNMENT AND AFFIXMENT SYSTEM FOR TRIM PARTS

(75) Inventors: Craig R. Markyvech, Romulus, MI (US); Igor M. Kan, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 231 days.

(21) Appl. No.: 12/169,673

(22) Filed: Jul. 9, 2008

(65) Prior Publication Data

US 2010/0006218 A1  Jan. 14, 2010

(51) Int. Cl.
*B29C 65/02* (2006.01)
(52) U.S. Cl. .............. 156/275.5; 156/272.2; 156/314; 156/330; 156/578; 156/379.8; 296/202
(58) Field of Classification Search .............. 156/275.2, 156/275.3, 275.5, 275.7, 330, 314
See application file for complete search history.

(56) References Cited

U.S. PATENT DOCUMENTS 5,320,151 A * 6/1994 Wumer .................. 144/348

FOREIGN PATENT DOCUMENTS

| JP | 11333863 A | * | 12/1999 |
| JP | 2006167657 A | * | 6/2006 |
| JP | 2006176653 A | * | 7/2006 |

OTHER PUBLICATIONS

"High Peel/Cleavage Strength Glass to Metal Adhesive Multi-Cure(R) 505 Series" Product Data Sheet of Dymax Corporation of Torrington, CT 06790, dated Feb. 28, 2006.
"Robust, Fast, Reliable Structural Bonding Dymax 500-ER Solvent Free Activator" Product Data Sheet of Dymax Corporation of Torrington, CT 06790, dated Feb. 28, 2006.
"Try Our Genuine Ultraviolet LED" Press Release of Model No. NCSU033A of Nichia Corporation, Tokyo, Japan, dated 2005.
Specifications for Nichia Chip Type UV LED Model: NCSU033A(T) of Nichia Corporation, Tokyo, Japan, believed dated 2005.
"Black-LED-365 Fiber Coupled UV LED Light Source" of Prizmatix, Ltd. of Modiin-lite 71919, Israel, date unknown (but believed created Dec. 2007).

* cited by examiner

*Primary Examiner* — Kahnh Nguyen
*Assistant Examiner* — Margaret Squalls

(57) ABSTRACT

A trim part is aligned, via a flexible, split jig, to a finished primary surface and adhered by an epoxide to a secondary structural surface. An epoxide fixing accelerant is applied to the epoxide via the jig, whereby the trim part is rapidly rigidly affixed to the secondary structural surface. The jig is then removed via its being both split and resiliently flexed.

7 Claims, 5 Drawing Sheets

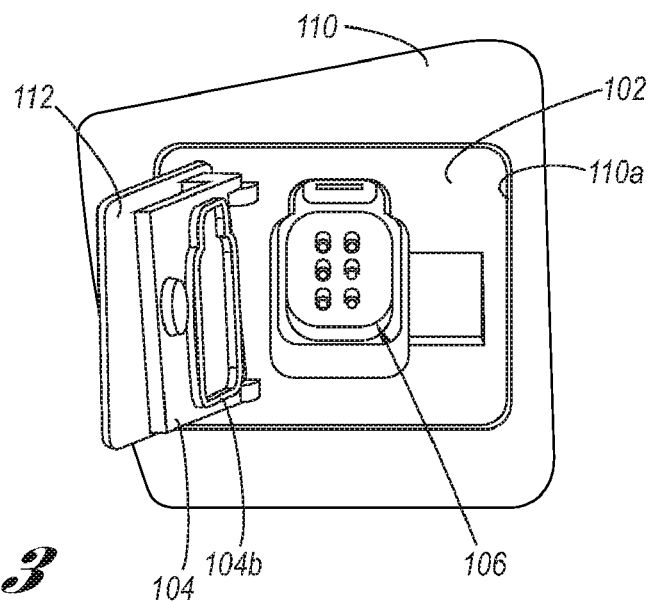
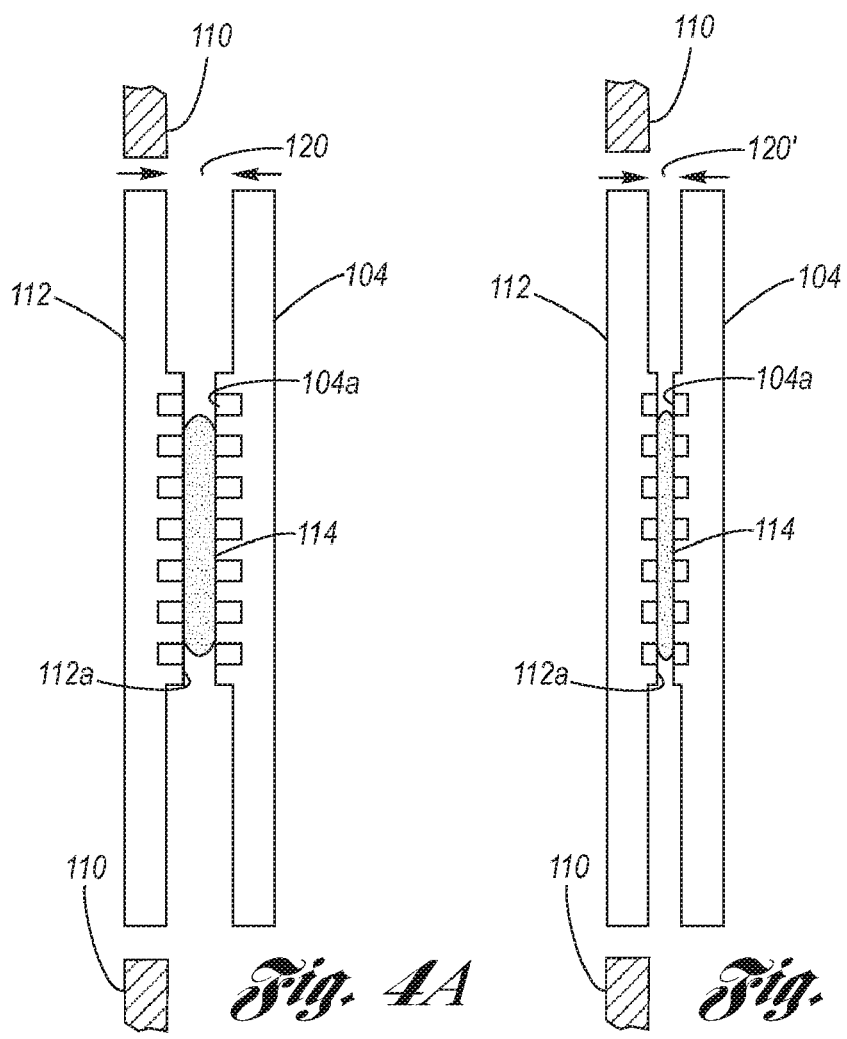

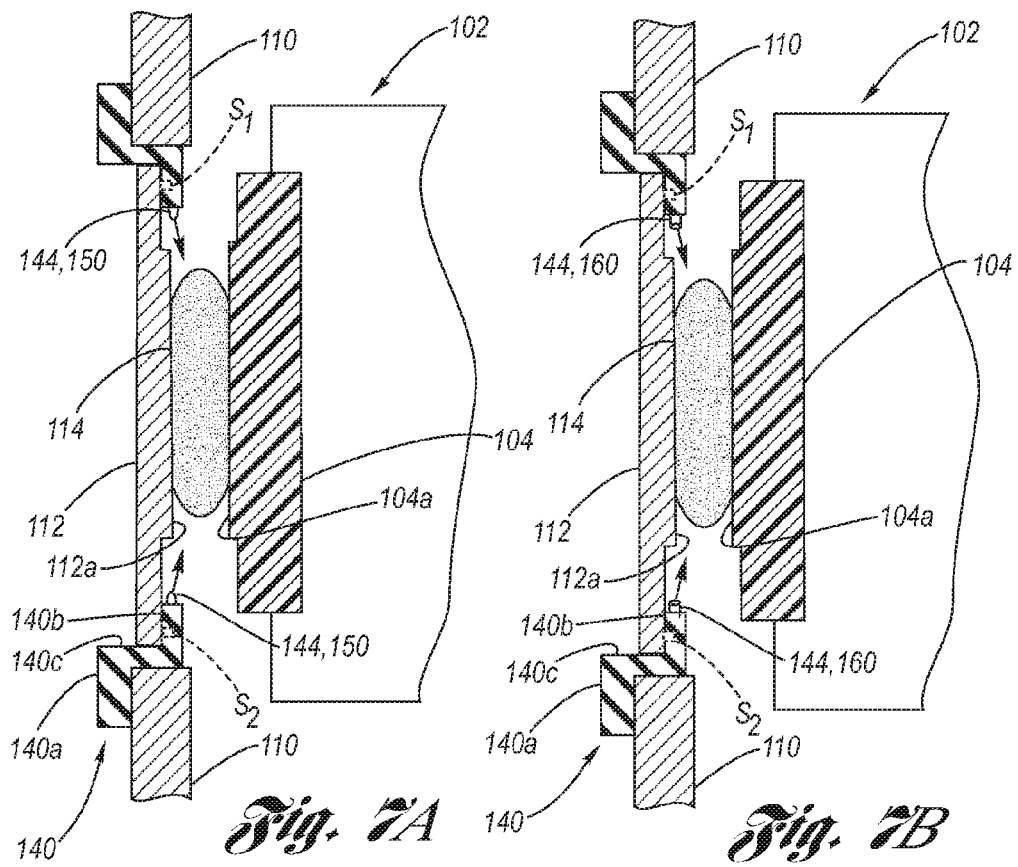
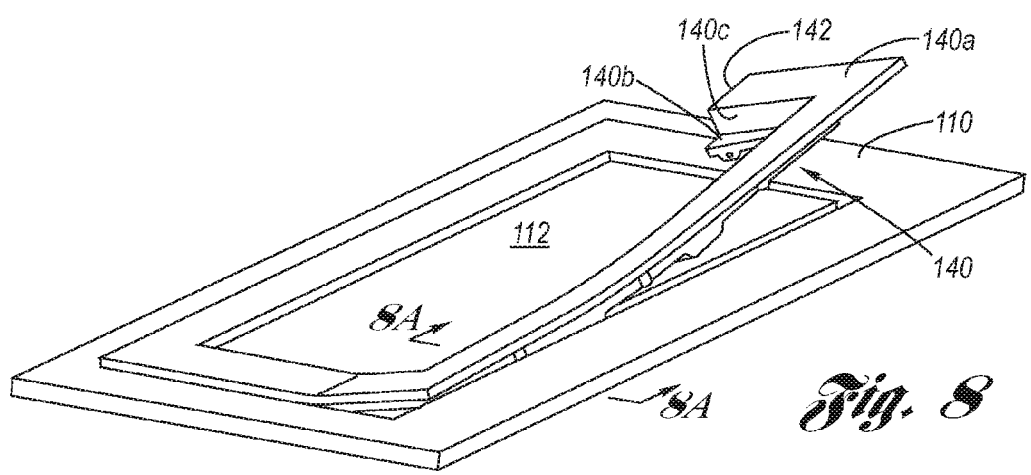
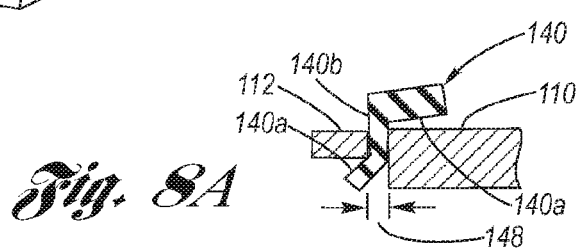

ALIGNMENT AND AFFIXMENT SYSTEM FOR TRIM PARTS

TECHNICAL FIELD

The present invention relates, in general, to manufacturing techniques which allow for precision alignment of trim parts on or near finished surfaces without damaging the surface finish. More particularly, the present invention relates to a fixturing system which utilizes an epoxide fixing accelerant in order to provide rapid epoxy surface curing in a confined space and thereby facilitate precision alignment of trim parts on or near finished surfaces without damaging the surface finish.

BACKGROUND OF THE INVENTION

The perception of automotive quality is a key component in the marketing of motor vehicles, particularly passenger cars, in the North American market. The consumer will often consider cosmetic attributes as much as other attributes in developing this perception of automotive quality. How well the trim parts fit, how well the doors close, how smooth the line of the car, contribute as much to the perception of quality of the vehicle as the evaluation of the more significant operational components such as the power train and suspension. The impact of these issues on the perception of quality, and, in turn, their impact on automotive sales, provide a stimulus to automobile manufacturers to focus on improving the fit of the final trim parts on the exterior of motor vehicles.

Automobile manufacturing is a high volume industry. Premium is placed on the speed of manufacturing. Power tools, both electric and pneumatic, have been highly integrated into the production processes. To facilitate the use of power tools, a variety of technologies have been developed. Such things as guide screws and grommets have been incorporated to facilitate the rapid placement of parts that have to be aligned with precision.

However, these devices cannot be used with finished surfaces. Guide screws can mar the finish of the finished surface, and flexible grommets which are customarily used to take up build variation do not meet customer expectations for finished surfaces. The customer expects the vehicle lines and surfaces to be unobstructed and unmarred. The processes involved in the alignment of trim parts must be designed with both the precision of the alignment and the final appearance taken into account.

Epoxides (also known as expoxies or epoxy agents) have been considered as a substitute for grommets and gaskets in manufacturing processes. The most common types of agents used in epoxides are known as binary agents. Binary agents involve two components which are chemically inert when separated, but when they come into contact with each other (i.e., mix) they react to form a strong chemical bond therebetween. The chemical reactions involved may be exothermic which means they produce heat, or endothermic which means they require heat or some other form of energy to proceed to completion.

In a typical manufacturing application involving the bonding together of two parts, either one part would be treated with the first component of the binary agent and the mated part would be treated with the other component, or a pre-mixed epoxide would be placed onto one or both of the parts immediately upon the mixing. When the parts are joined, the binary agents may react exothermically or endothermically to proceed to completion. This process is known in the art as curing. Once the epoxide has cured, a strong bond is formed between the two epoxy materials. This technology has been developed to serve as a fastener material in a wide variety of applications.

One difficulty with thermal curing is that precisely mated surfaces, with very tight tolerances, may be distorted by the amount of heat involved in the epoxification process. In particular, the tolerances required for trim part alignment are much too tight to be used in conjunction with thermal curing. Another difficulty with thermal curing is that there is a minimum duration required during which the parts being bonded need to be held in place until the epoxides are sufficiently stiff such that the parts are rigidly affixed to each other.

To provide rapid set (hardening) and avoid spot heating of the epoxide at the point of reaction, a known technique is to apply an epoxide fixing accelerant to the surface of the epoxide.

One epoxide fixing accelerant technology that has developed over the years is ultraviolet (U-V) epoxide surface fixing. In this process, the epoxy agents used in the expoxification reaction are exposed to U-V light, as for example via U-V diodes, as a source of energy. The epoxide surfaces are tacked together strongly by fusing the surface molecules of the two agents, thereby creating a strong surface bond. This provides a rapid stiffness in which two surfaces become mutually affixed, while the chemical curing process can be allowed to proceed at a slower speed where during the reaction may operate at lower temperatures, not requiring external heating, which, in turn, eliminates thermal distortion of the surfaces. A common application of this technology is in the dental arts.

Another epoxide fixing accelerant technology that has also been developed is the use of a liquid epoxide accelerator (also known as a liquid epoxide curing agent or a liquid epoxide activator), to promote curing through chemical means, by lowering the energy required to complete the chemical reactions involved in the epoxide curing (fixing), thereby speeding up the curing process. Typically, the liquid epoxide accelerator is deployed as a spray (aerosol) upon the epoxide.

Accordingly, what remains needed in the art is a means to align finished trim parts with respect to a primary finished surface, and simultaneously bond the trim part to a secondary structural surface without the marring of finished surfaces.

SUMMARY OF THE INVENTION

The present invention provides a method and apparatus for aligning a (typically finished) trim part with respect to a (typically finished) primary surface and a (typically unfinished) secondary structural surface, while simultaneously directing an epoxide fixing accelerant into a confined region in order to initiate surface fixing (curing, setting) of the epoxide, whereby the trim part is rapidly rigidly affixed to the secondary structural surface. Additionally, the present invention provides alignment of a finished primary surface with a finished trim part while referencing a (typically unfinished) secondary structure to which the trim part is rigidly affixed, in order to avoid marring or damaging the finished surfaces.

According to the method of the present invention, a finished trim part is aligned through the use of a jig with respect to both the finished primary surface and the (typically unfinished) secondary structural surface, wherein the jig is structured so as not to mar the finished surfaces and be flexible for easy removal. The jig is configured in the form of an outer perimeter flange, an inner perimeter flange and a normally disposed sidewall connecting the inner and outer perimeter flanges. The outer perimeter flange is intended to rest upon the finished primary surface, as for example a fender, while the inner perimeter flange and the sidewall are intended to locate the trim part relative to the finished primary surface and the secondary structural surface. These goals are met by structuring the jig as a singly split, resiliently flexible material.

In order to compensate for all predetermined assembly induced variances of the manufacturing process as between the location of the primary finished surface and the secondary structural surface, vis-a-vis alignment of the trim part with respect thereto, an epoxy mounting technique is utilized in conjunction with the jig. In this regard, an epoxide fixing accelerant is employed to quickly fix (set or cure) the epoxide with a rigid bond of the trim part to the secondary structural surface at the jig defined alignment location with respect to the finished primary surface.

In order to achieve this surface fixing (setting or curing) of the epoxide, the jig must facilitate the introduction of an epoxide fixing accelerant upon the surface of the epoxide.

In a first exemplification of application of an epoxide fixing accelerant, high intensity ultraviolet (U-V) light is carried by the jig which is selectively actuated to shine upon the epoxide at the time of bonding. For example, the jig is provided with a plurality of U-V light emitting diodes at cavities formed in the inner perimeter flange. The U-V light emitting diodes are activated when the trim part is properly located by the jig and the epoxide is in mutual contact and in contact with the trim part and the secondary structural surface. Once the epoxide has been exposed to a sufficient dose of U-V light such that the epoxide is stiff (whereby the trim part is rigidly affixed to the secondary structural surface), the diodes are turned off and the jig is removed.

In a second exemplification of application of an epoxide fixing accelerant, a liquid epoxide accelerator is carried by the jig which is selectively sprayed upon the epoxide at the time of bonding. The jig is provided with a plurality of liquid accelerator nozzles at cavities formed in the inner perimeter flange. The spraying is activated when the trim part is properly located by the jig and the epoxide is in mutual contact with the trim part and the secondary structure. Once the epoxide has been exposed to a sufficient amount of liquid accelerator such that the epoxide is stiff (whereby the trim part is rigidly affixed to the secondary structural surface), the spray is turned off and the jig is removed.

The method according to the present invention is generally characterized by the following steps: 1) applying a (preferably pre-mixed) epoxide (epoxy, epoxy agent) to at least one of a secondary structure and a trim part, 2) installing the jig at an opening of a primary surface, 3) locating the trim part in the jig, 4) applying an epoxide fixing accelerant to the epoxide to accelerate fixing of the epoxide, and 5) removing the jig, wherein steps 1) and 2) may be reversed in order of performance.

Accordingly, it is an object of the present invention to align a finished trim part with respect to a finished primary surface and a secondary structure, while simultaneously directing an epoxide fixing accelerant into a confined region in order to initiate surface fixing of an epoxide to thereby rapidly rigidly affix the trim part to the secondary structure, while maintaining its alignment with the primary surface.

This and additional objects, features and advantages of the present invention will become clearer from the following specification of a preferred embodiment.

BRIEF DESCRIPTION OF THE DRAWINGS

FIG. 3 is a front view showing the finished trim part cover of FIG. 1, disposed in its open position with respect to the adjacent finished fender component.

FIGS. 4A and 4B are partly sectional side views, illustrating variance in gap tolerance between the finished trim part cover and a receptacle seal door of the electrical receptacle assembly.

FIG. 7A is a partly sectional side view of the jig according to the present invention locating the finished trim part cover with respect to the receptacle seal door, wherein epoxide therebetween is being cured via activation of light emitting diodes.

FIG. 7B is a partly sectional side view of the jig according to the present invention locating the finished trim part cover with respect to the receptacle seal door, wherein epoxide therebetween is being cured via spraying of a liquid fixing accelerator.

FIG. 8 is a perspective view showing the jig according to the present invention in process of removal after the finished trim part cover has been affixed by the epoxide to the receptacle seal door.

FIG. 8A is a sectional view, seen along line 8A-8A of FIG. 8.

DESCRIPTION OF THE PREFERRED EMBODIMENT

Figure 1:
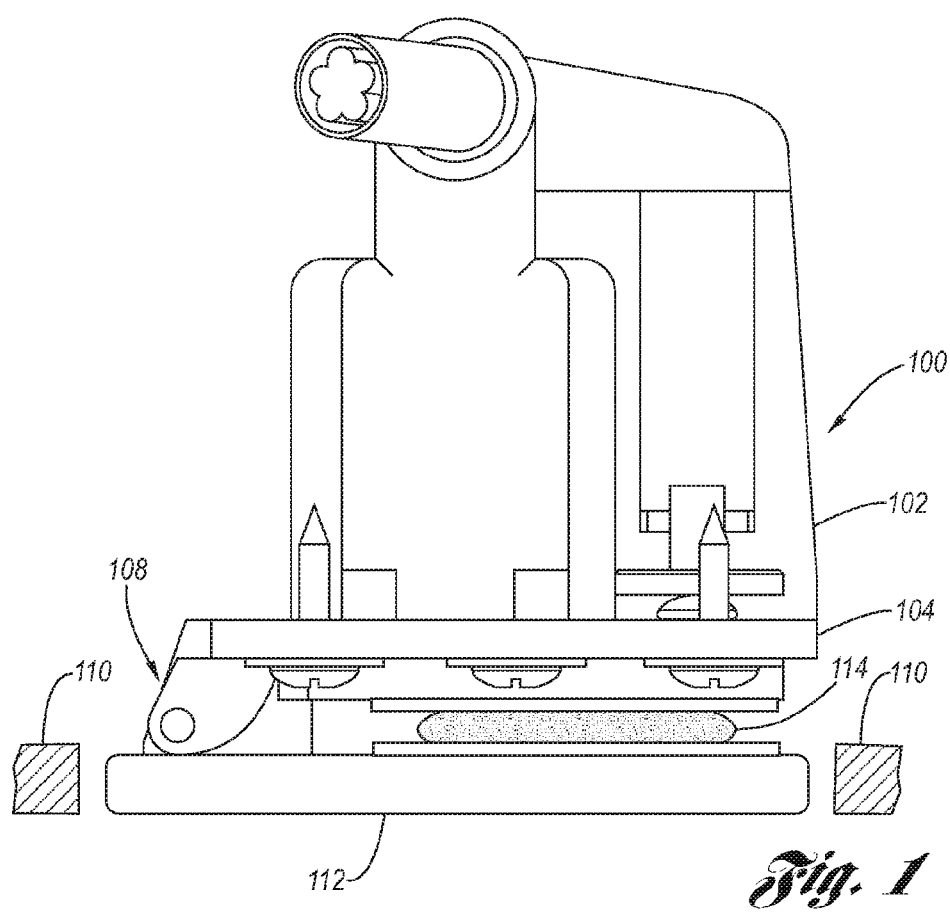
FIG. 1 is a top plan view of a electrical receptacle assembly, its finished trim part cover and an adjacent finished fender component.

Referring now to the Drawing, FIGS. 1 through 10 depict aspects of the alignment and affixment system according to the present invention. While the various views depict, by way of exemplification, aligning a trim part in the form of a finished trim part cover with respect to a primary surface in the form of a finished fender component and affixing the trim part cover to a secondary structure in the form of an unfinished seal door for an electrical power receptacle, it is to be understood that the present invention relates more generally to the alignment of any trim part to any primary surface and to the affixment of the trim part to any secondary structure.

Figure 2:
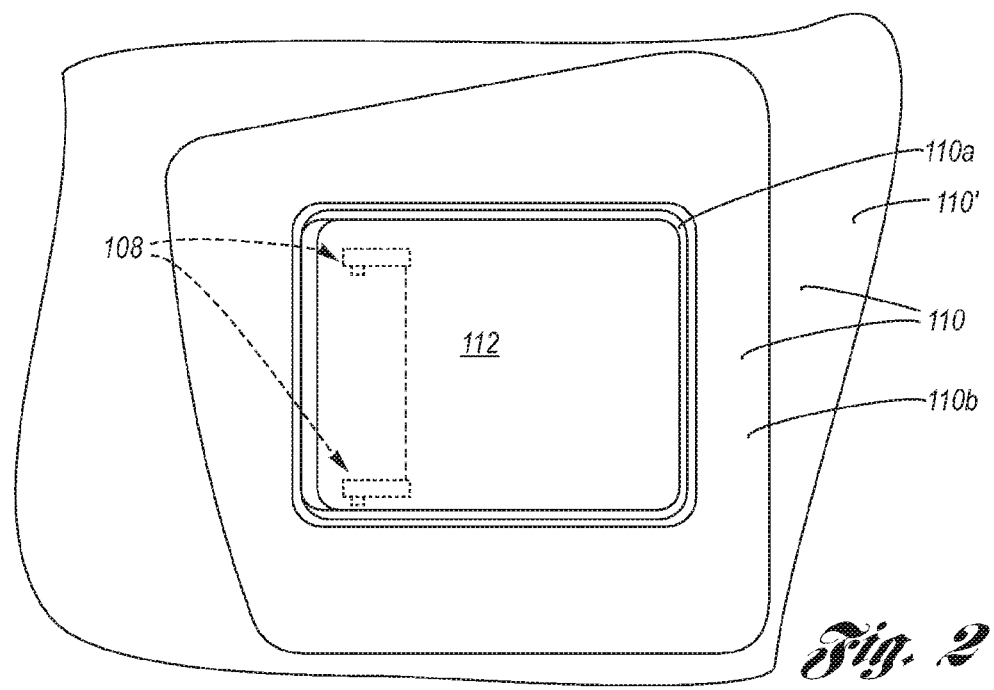
FIG. 2 is a front view showing the finished trim part cover of FIG. 1, disposed in its closed position with respect to the adjacent finished fender component.
Figure 5:
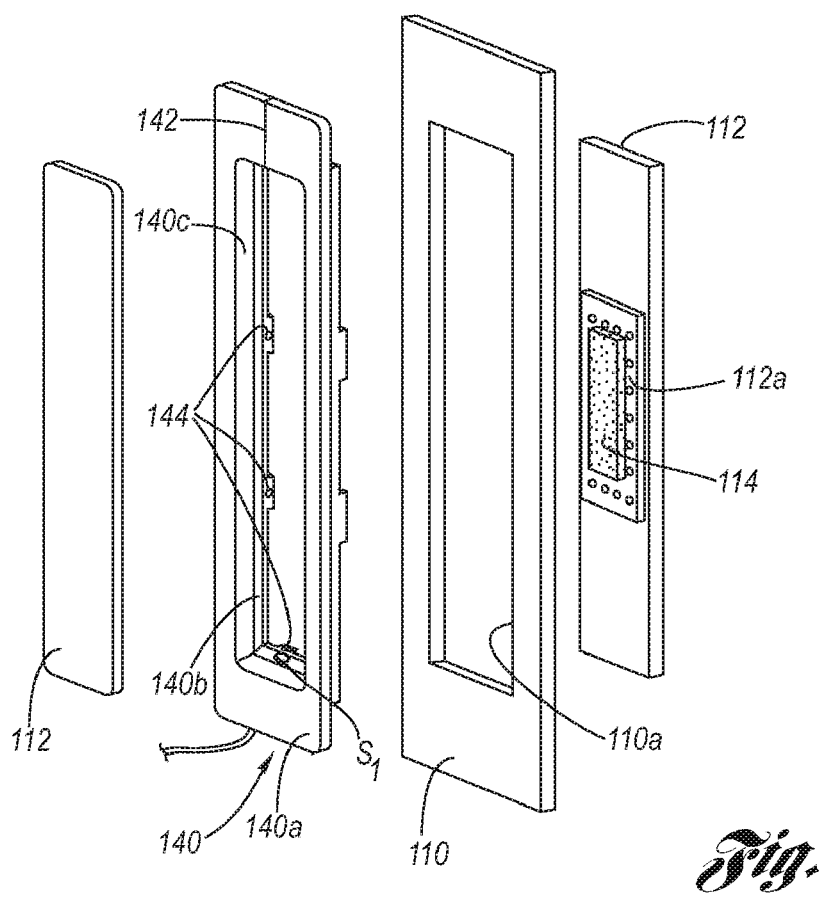
FIG. 5 is an exploded perspective view of the jig according to the present invention, finished trim part cover, receptacle seal door, and adjacent finished fender component.
Figure 6:
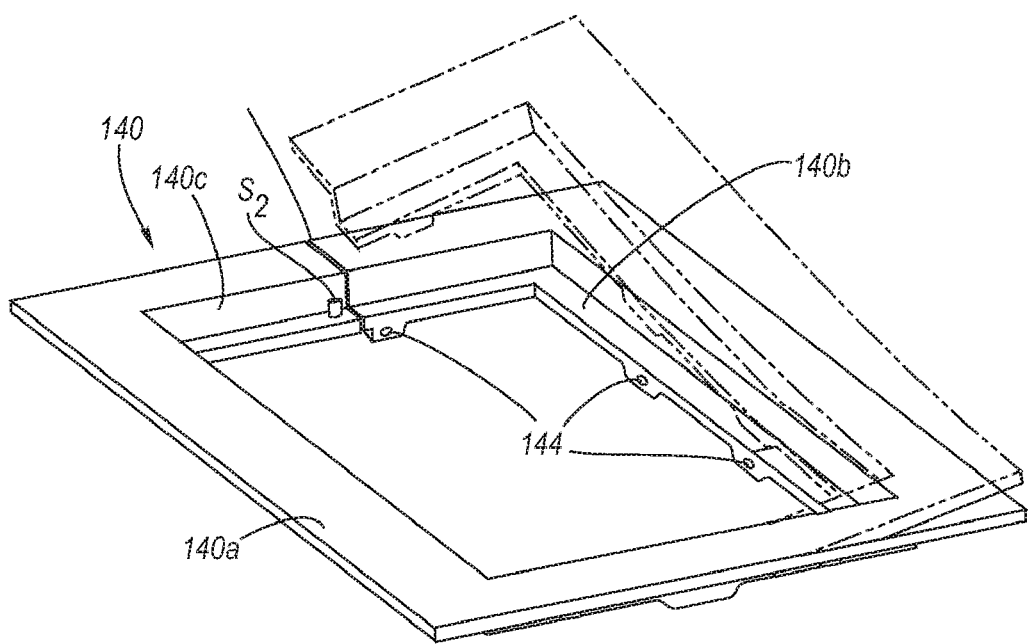
FIG. 6 is a perspective view showing the jig according to the present invention, wherein the flexible splitting capability thereof is shown in phantom.

FIGS. 1 through 3 depict a non-limiting example of an environment of use of the alignment and affixment system according to the present invention. An electrical receptacle 100 includes an electrical receptacle housing 102, which provides a strong supportive structure which is, in turn, connected to a structural member of the motor vehicle (not shown). A receptacle seal door 104 (which may or may not be finished, being shown as unfinished) provides both a cover and a seal for a plug receptacle 106 (see FIG. 3) at the front face of the electrical receptacle housing 102. The receptacle seal door 104 pivots on a hinge 108 which is connected to the receptacle housing 102. The plug receptacle 106 is positioned at a fender opening 110a in a fender component 110, wherein by fender component is meant the fender 110' and/or a bezel 110*b* circumscribing the fender opening. When the seal door 104 is pivoted to its closed position, as shown at FIG. 1 it covers and seals, via a seal 104*b* (see FIG. 3) the plug receptacle 106. When the seal door is pivoted to its open position, as shown at FIG. 3, an operator of the motor vehicle has ready access to the plug receptacle 106 for inserting and removing a charging plug (not shown) thereinto. It is to be understood, however, that the receptacle 100 could be other than electrical, being a fuel receptacle or hybrid electrical and fuel receptacle.

In order to provide a finished, Class A appearance at the fender opening 110*a*, a trim part cover 112 is provided which matches the finish of the fender component 110 (that is, the fender 110' and/or its bezel 110*b*, if provided) and is precisely fitted in planar (i.e., flush) aligned relation to the fender at the fender opening 110*a*. The trim part cover 112 is attached to the seal door 104, and thereby pivots in unison with the seal door on the hinge 108. The attachment of the trim part cover 112 to the seal door 104 is via an epoxide 114. The epoxide 114 has a width which contacts both of the trim part cover 112 and the seal door 104, whereby the planar alignment of the trim part cover to the fender component 110 is provided.

FIG. 2 shows the area of the fender component 110 adjacent the receptacle housing 102, wherein the seal door 104 is at the closed position and the trim part cover 112 is in planar alignment with respect to the fender component 110. Where used, the bezel 110*b* covers the margins adjacent the fender opening 110*a* and provides a robust feature at an otherwise vulnerable portion of the fender 110', which can be subjected to finish injury by untoward operator manipulation of an electrical plug, etc.

A key aspect of the present invention is the ability to compensate for build variation between vehicles while meeting both the engineering requirements that the seal door 104 seal the plug receptacle 106 and the cosmetic requirement of providing an outside appearance which requires a Class A finish and planar (i.e., flush) alignment of the exteriorly viewed trim part cover 112 with respect to the fender component 110.

Referring now to FIGS. 4A and 4B, the means by which the present invention allows for build variation between vehicles is illustrated. FIG. 4A is an illustration of a "large" gap 120 between the seal door 104 and the trim part cover 112 which must be bridged to allow for the planar alignment of the trim part cover with respect to the fender component 110. The bridging is accomplished by a relatively wide width of the epoxide 114, which, when cured, rigidly affixes the relative position of the trim part cover 112 to the seal door 104. FIG. 4B is an illustration of a "small" gap 120 between the seal door 104 and the trim part cover 112 which must be bridged to allow for the planar alignment of the trim part cover with respect to the fender component 110. The bridging is accomplished by a relatively narrow width of the epoxide 114, which, when fixed (cured or set), rigidly affixes the relative position of the trim part cover 112 to the seal door 104. In order to facilitate expoxide adhesion, the seal door 104 may be provided with a perforated or otherwise roughened raised surface feature 104*a* (see FIGS. 4A, 4B, 5, 7A and 7B); and the trim part cover 112 may be similarly provided with a roughened raised surface feature 112*a*.

The application of the epoxide 114 is well known in the art, wherein, by way of example, the raised surface 104*a* is impregnated with a glob of epoxide (see FIG. 5) which is preferably pre-mixed and has sufficient thickness to bridge any gap to the raised surface 112*a* of the trim part cover 112 when it is at its aligned location. Alternatively, the trim part cover or both of the trim part cover and the seal door may have a glob of epoxide (see FIGS. 7A and 7B).

Another key aspect of the present invention is a jig 140 which aligns the (finished) trim part cover 112 with respect to the (finished) fender component 110 and the (unfinished) surface 104*a* of the seal door 104. The jig 140 is structured so as not to mar the finished surface of the fender component and the trim part cover, and is flexible for easy removal, being composed, for example, of a resiliently flexible nylon material. The jig 140 is configured in the form of an outer perimeter flange 140*a*, an inner perimeter flange 140*b* and a normally disposed sidewall 140*c* connecting the inner and outer perimeter flanges. A single slit 142 is provided, preferably at one end of the jig 140, to facilitate removal, discussed hereinbelow.

The installation of the jig 140 (see FIGS. 5, 7A and 7B) involves the outer perimeter flange 140*a* resting upon the fender component 110 in circumscribing relation to the fender opening 110*a*, wherein the sidewall 140*c* passes through the fender opening such that the inner peripheral flange 140*b* is situated within the fender opening. In this regard, the inner perimeter flange 140*b* and the sidewall 140*c* are dimensioned to seat and locate the trim part cover 112 relative to the fender component 110 and the seal door 104.

The removal of the jig 140 (see FIGS. 6, 8 and 8A) involves the resilient flexibility of the jig material in combination with the slit 142, wherein easy removal of the jig is possible, even as the trim part cover 112 has been rigidly affixed to the seal door 104. In this regard, as can be discerned from FIG. 8A, the resilient flexibility of the jig 140 permits the inner peripheral flange 140*b* to slip through the gap 148 between the trim part cover 112 and the fender component 110, while the slit 142 allows the jig to be removed around the edges of the trim part cover. When the jig 140 is removed, it will have resiliently returned to its original shape, and be ready for re-use.

Yet another key aspect of the present invention is the provision for application of an epoxide fixing accelerant to provide rapid curing of the epoxide 114, whereby the trim part cover 112 need be held seated in the jig 140 for just a minimal amount of time before the jig can be removed (as per FIG. 8). Accordingly, the jig 140 carries a plurality of epoxide fixing accelerant sources 144, for example either light emitting diodes (LEDs), preferably emitting ultra-violet (U-V) light, 150 or spray nozzles 160 for a liquid epoxide accelerator. In this regard, the inner peripheral flange 140*b* is provided with a plurality of cavities at each of which being disposed an epoxide fixing accelerant source 144 (i.e., a U-V diode 150 or a spray nozzle 160). Further, in order to automate the actuation of the U-V diodes 150 or the spray from the spray nozzles 160, it is preferred to locate momentary switches $S_1$ and $S_2$, at each end of the peripheral flange, respectively, wherein an electric circuit is completed only when the trim part cover 112 is properly seated in the jig 140. Alternatively to the switches, the dispensing of the epoxide fixing accelerant may be manually or automatically actuated externally to the jig.

Figure 9:
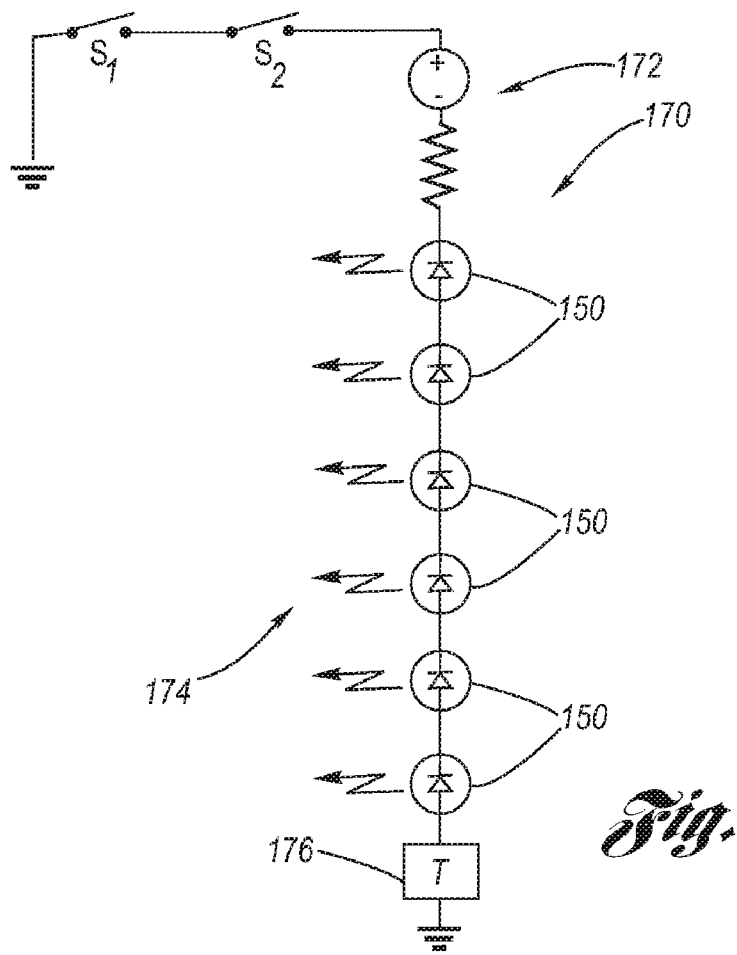
FIG. 9 is a schematic diagram of a ultraviolet light emitting diode circuit pursuant to a first form of epoxide fixing accelerant according to the present invention.

Referring to FIGS. 7A and 9, with the jig 140 in place on the fender component 110 and an epoxide glob applied as described, the trim part cover 112 is seated into the jig, whereupon the switches $S_1$ and $S_2$ are depressed at the moment the trim part cover 112 is properly seated in the jig 140. An electrical circuit 170, includes a plurality of U-V light emitting diodes 150, a power supply 172, and a timer 176, wherein the U-V light emitting diodes emit U-V light 174 onto the epoxide 114, causing rapid surface curing of the epoxide. The timer 176 automatically opens the circuit, switching off the U-V diodes when a sufficient dose of U-V light has been supplied. Thereafter, the jig is removed as described. Alternatively, it is possible, though not as preferred, to utilize fiber optic cables to conduct U-V light to each of the epoxide fixing accelerant sources 144 from a U-V diode source.

Figure 10:
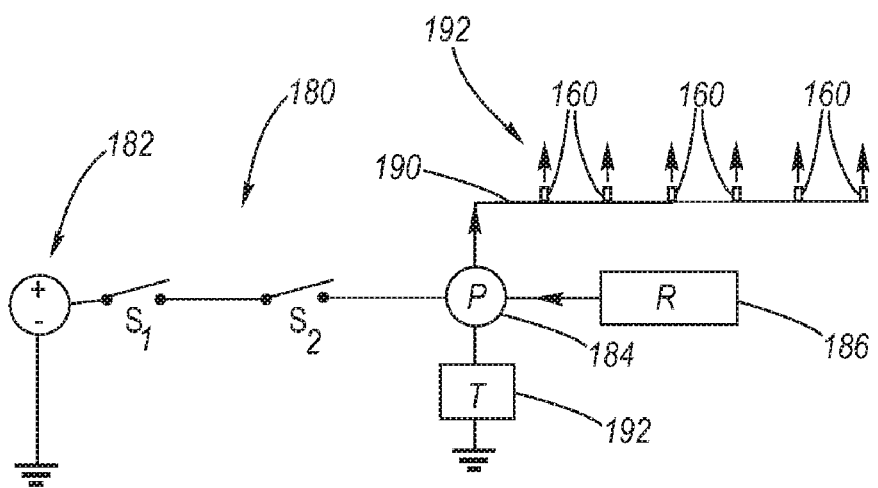
FIG. 10 is a schematic diagram of both electrical and fluid circuits pursuant to a second form of epoxide fixing accelerant according to the present invention.

Referring to FIGS. 7B and 10, with the jig 140 in place on the fender component 110 and an epoxide glob applied as described, the trim part cover 112 is seated into the jig, the switches $S_1$ and $S_2$ are depressed at the moment the trim part cover is properly seated in the jig 140. The electrical circuit 180 includes a timer 192 and a pump 184, and may include a power supply 182, wherein the pump is actuated, whereupon liquid epoxide accelerator 192 is drawn from a reservoir 186 sent through a fluid conduit 190 (part of which being in the jig) and sprayed through the spray nozzles 160 on to the epoxide 114, causing rapid surface curing of the epoxide. The timer 192 automatically opens the circuit, switching off the pump 184 when a sufficient amount of liquid epoxide accelerator has been supplied. Thereafter, the jig is removed as described.

By means of an example, Dymax Corporation of Torrington Conn. manufactures a material Dymax 605 which is an epoxide resin that is suitable for use in the present invention that may be cured using either ultraviolet light with a wavelength of 365 nanometers or a liquid (aerosol) epoxide accelerator. Dymax also manufactures a material Dymax 500-ER which can be used as an activator with Dymax 605 resin. Product data shows that a 2 mil gap requires a fixture time of 12 seconds. When used with the ultraviolet light of 365 nanometers the cure time required for a similar sample is 30 seconds. The 365 nanometer light emitting diodes may be obtained, for example, from Prizmatix Ltd., an Israeli manufacturer, through their Michigan sales office.

Once the epoxide 114 has cured sufficiently that it is stiff and the trim part cover 112 rigidly affixed in relation to the seal door 104, the jig 140 is removed, as shown at FIG. 8. This procedure entails flexing of the jig 140 such that the inner peripheral flange 140 and its associated sources of epoxide fixing accelerant are slid out through the gap 148 (see FIG. 8A) between the trim part cover 112 and the adjacent fender component 110. The removal is carefully managed as to not disturb or disconnect the wires (and conduits, if present) which supply power (and liquid) to the epoxide fixing accelerant sources 144. Further with regard to removal of the jig 140, given a gap 148 of about 1.5 mm to allow for door swing, the U-V diodes 150 may be about 1.0 mm in width and about 3.0 mm in length whereby they fit through the gap, per FIG. 8A.

To those skilled in the art to which this invention appertains, the above described preferred embodiments may be subject to change or modification. Such change or modification can be carried out without departing from the scope of the invention, which is intended to be limited only by the scope of the appended claims.

The invention claimed is:

1. A method for attaching and aligning a trim part to a secondary structure, comprising:

applying an epoxide to at least one of a trim part and a secondary structure;

placing a resiliently flexible jig into an opening of a primary surface;

seating the trim part into the jig in proximal relation to the secondary structure such that the epoxide contacts both the trim part and the secondary structure and such that the trim part is planar aligned to the primary surface;

applying, via the jig, an epoxide fixing accelerant to the epoxide; and removing the jig after the epoxide has stiffened such that the trim part is rigidly affixed in relation to the secondary structure, wherein the trim part remains planar aligned to the primary surface;

wherein said step of removing comprises the jig being resiliently flexed so as to pass between the trim part and the primary surface at the opening; and wherein said step of removing further comprises splitting the jig at a selected location thereof.

2. The method of claim 1, wherein during said step of removing, the trim part remains planar aligned to the primary surface.

3. The method of claim 2, wherein said step of applying comprises applying ultraviolet light to the epoxide from a plurality of sources carried by the jig.

4. The method of claim 2, wherein said step of applying comprises applying a liquid fixing accelerator to the epoxide from a plurality of sources carried by the jig.

5. A method for attaching and aligning a trim part, comprising:

applying an epoxide to at least one of a finished trim part and a seal door of a receptacle;

placing a resiliently flexible jig into an opening of a finished fender component having a primary surface;

seating the finished trim part into the jig in proximal relation to the seal door such that the epoxide contacts both the finished trim part and the seal door and such that the finished trim part is planar aligned to the primary surface;

applying, via the jig, an epoxide fixing accelerant to the epoxide; and removing the jig after the epoxide has stiffened such that the finished trim part is rigidly affixed in relation to the seal door;

wherein during said step of removing, the finished trim part remains planar aligned to the primary surface and the jig is split at a selected location thereof and resiliently flexed so as to pass between the finished trim part and the finished fender component at the opening.

6. The method of claim 5, wherein said step of applying comprises applying ultraviolet light to the epoxide from a plurality of sources carried by the jig.

7. The method of claim 5, wherein said step of applying comprises applying a liquid fixing accelerator to the epoxide from a plurality of sources carried by the jig.

* * * * *